United States Patent [19]

Robinson et al.

[11] 4,001,068

[45] Jan. 4, 1977

[54] PROCESS FOR SEALING GLASS TO METAL

[75] Inventors: Glenn Nelson Robinson, Terre Haute, Ind.; Louis A. Jurisch, Marengo, Ill.

[73] Assignee: IMC Chemical Group, Inc., Terre Haute, Ind.

[22] Filed: Oct. 2, 1975

[21] Appl. No.: 618,873

[52] U.S. Cl. .................. 156/315; 156/331; 260/67.5; 260/307 F; 427/407 A; 427/409; 428/424; 428/460; 428/436; 428/524

[51] Int. Cl.² ......................................... C09J 5/04

[58] Field of Search .......... 156/331, 315, 314, 316, 156/309, 310, 313; 428/424, 425, 426, 432, 433, 436, 457, 460, 524; 427/407, 409; 260/307 F, 67 R, 78.4 R, 67.5; 29/195 R, 195 G, 195 P, 195 L, 195 W

[56] References Cited

UNITED STATES PATENTS

| | | | |
|---|---|---|---|
| 2,708,650 | 5/1955 | Pullman et al. | 428/424 |
| 2,924,571 | 2/1960 | Hughes | 260/307 F |
| 2,948,691 | 8/1960 | Windemuth et al. | 260/2.5 |
| 3,235,557 | 2/1966 | Wiggins et al. | 260/307 F |
| 3,367,895 | 2/1968 | Clark | 260/307 F |
| 3,419,520 | 12/1968 | Campbell et al. | 260/41.5 |
| 3,459,584 | 8/1969 | Caldwell | 428/425 |
| 3,523,123 | 8/1970 | Wehrmeister | 260/307 |
| 3,654,229 | 4/1972 | Hunsucker | 260/67.5 |
| 3,737,408 | 6/1973 | Hunsucker | 260/67.5 |
| 3,839,350 | 10/1974 | Hunsucker | 260/307 F |

*Primary Examiner*—Charles E. Van Horn
*Assistant Examiner*—J. J. Gallagher
*Attorney, Agent, or Firm*—Robert H. Dewey; Howard E. Post

[57] ABSTRACT

A process for sealing glass to metal by applying a methylolated polyoxazoline to the surfaces of the glass and metal which are to be joined, applying a sealant to the oxazoline-coated surfaces, joining the glass and metal surfaces to be sealed and allowing the sealant to dry.

12 Claims, No Drawings

PROCESS FOR SEALING GLASS TO METAL

BACKGROUND OF THE INVENTION

This invention relates to a process for sealing glass to metal. In a particular aspect, this invention relates to an improved process for sealing glass and metal surfaces whereby the primer coats previously employed are replaced by a methylolated polyoxazoline.

Sealing glass-to-metal surfaces is difficult to accomplish satisfactorily because the coefficient of expansion of glass is so different from that of metal, usually steel. This problem has been solved by placing between the joined surfaces a sealant of polymeric material. However this type of material does not adhere well to either of these surfaces and it has been necessary to apply several coats of a primer to both the metal and the glass to obtain satisfactory adhesion. However this step requires additional drying time and adds to the cost. Accordingly an improved method of promoting adhesion of the sealant polymer is needed.

SUMMARY OF THE INVENTION

It is an object of this invention to provide a process for sealing glass to metal surfaces.

It is another object of this invention to provide an improved process for sealing glass to metal by substituting a methylolated polyoxazoline for the primer coating previously used.

Other objects of this invention will be obvious to those skilled in the art from the disclosure herein.

The present invention is directed to an improved process for sealing glass to metal by the process of applying a base coating to the glass and metal surfaces to be sealed, applying an adhesive to said surfaces, joining said surfaces and drying said adhesive, the improvement comprising using as said base coating a methylolated polyoxazoline.

DETAILED DISCUSSION

The methylolated polyoxazoline (MPO) used in the practice of this invention is prepared in general according to the processes of A. W. Campbell et al., U.S. Pat. No. 3,419,520 and H. L. Wehrmeister, U.S. Pat. No. 3,523,123 which are incorporated herein by reference thereto. Products of this type are prepared by reacting an aminohydroxy compound represented by the formula

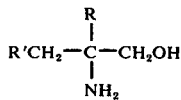

where R is methyl, ethyl or hydroxymenthyl and R' is hydrogen or hydroxyl, with a saturated, aliphatic, polybasic acid (or ester thereof). A preferred polybasic acid is a dibasic acid represented by the formula $(CH_2)_x(COOH)_2$, where $x$ is 0 or an integer from 1 to 7, and reacting the polyoxazoline so obtained with formaldehyde as is known in the art. Another preferred group of oxazolines are those prepared by reacting an aminohydroxy compound of the foregoing formula with a polybasic carboxylic acid such as a polymer or resin having free carboxylic acid groups, then condensing the product with formaldehyde or paraformaldehyde. Such polybasic acid polymers are well-known in the art. They include but are not limited to acrylonitrile-butadiene-styrene terpolymers having free carboxyl groups, high acid number alkyds or polyesters, and high acid number acrylics. In general, any of the acidic polymers which become water-soluble when neutralized with an amine or alkanolamine can be used to form the methylol polyoxazoline.

A particularly preferred MPO is the one derived from tris(hydroxymethyl)aminomethane and glutaric acid, then condensed with formaldehyde. Other suitable acids include but are not limited to oxalic, succinic, adipic and azelaic. Lower alkyl esters of these acids can also be used, as is known. Suitable oxazolines can also be prepared by reacting any of these acids or mixtures thereof, with 2-amino-2-methyl-1-propanol, 2-amino-2-methyl-1,3-propanediol or 2-amino-2-ethyl-1,3-propanediol and condensing the resulting oxazoline with formaldehyde.

In the practice of the present invention, the surfaces to be joined and sealed are coated with the MPO. The sealant is then applied to each of the metal and glass surfaces to be joined, and these surfaces are then joined with sufficient pressure to establish good contact. The assemblage is then stored until the adhesive has "dried" or set to maximum strength.

The adhesives used in the practice of this invention are any of those of the prior art. A very widely used and preferred adhesive is a urethane one-component pigmented isocyanate-terminated prepolymer of a high molecular weight polyether polyol which cures by reaction with moisture in the air. This adhesive is described in U.S. Pat. No. 2,948,691 which is incorporated herein by reference thereto. It is understood, however, that the practice of this invention is not limited to this adhesive.

The MPO can be applied to the surfaces to be joined by any convenient method, many of which are known. It is a viscous liquid and preferably is diluted to a viscosity, Gardner scale, of F to H with a suitable solvent, e.g. a lower aliphatic alcohol, preferably ethanol. The MPO can be applied by brushing, wiping, calendaring, or spraying. A thin film is preferred but it should be continuous for best results.

The adhesives used in this invention are applied by art-recognized methods, e.g. wiping, brushing or calendaring.

The invention will be better understood with reference to the following examples. It is understood, however, that the examples are intended for illustration only, and it is not intended that the invention be limited thereby.

EXAMPLE 1

Tris(hydroxymethyl)aminomethane, 121 g (1 mole) was delivered to a reaction vessel equipped with a heat source, an agitator, a condenser and a distillate trap. Dimethyl glutarate 320 g (2.1 mole) and catalyst (stannous octoate) 2 g, were added. The mixture was heated with agitation to 280° F over a period of 90 minutes while removing distillate (mostly water of reaction). The temperature was then gradually raised to 380° F with periodic determination of viscosity. When the viscosity reached X-Z, Gardner scale, the mixture was allowed to cool to 250° F, then paraformaldehyde 50 G (1.67 mole as formaldehyde) and 0.5 g sodium methylate catalyst were added with agitation. The temperature was maintained at 230°–250° F until the solution was clear. About 1 hour was required. The product was then allowed to cool to below 190° F and sufficient ethanol was added to provide a viscosity of F-H. The solids content of the resulting mixture was 62.4% by weight with a specific gravity of about 1.16 and a color of 6–7, Gardner scale.

A pair of steel panels, joined at one end, were prepared, forming a bifurcated object. About an inch from the end, the panels were bent in slightly so that they would be parallel to the sides of a sheet of glass when the glass was placed between them. Four of these objects were prepared. They were each given a prime coat of a commercial primer, flat black lacquer paint followed, after drying, by a coat of DuPont Lucite arcylic lacquer (No. 5120L metallic paint). This coating was allowed to dry 1 week.

A glass plate was coated on both sides with a clear primer (silicone oil dissolved in an aromatic solvent) and allowed to dry 5–10 minutes. A black primer (carbon black pigmented silicone oil dissolved in an aromatic solvent) was then applied over the clear primer and over the two inside surfaces of the bifurcated objects. The black primer was allowed to dry about 15 minutes until nearly tack-free. Then a one-fourth inch bead of adhesive (USM Bostick, made by USM Bostick Div., Boston St., Middleton, Mass., was used), a urethane one-component pigmented isocyanate-terminated prepolymer, was applied to both glass and metal surfaces to be joined. Two of the bifurcated objects were placed so that about 1 inch of each end of the bifur- the glass plate lay within the ends of each of the bifurcated objects and these ends were then pressed against the glass manually. In this manner there was obtained a glass plate with a bifurcated member at each end and sealed thereto on both sides. It was allowed to dry three days. Then each end of the assembly was placed in a tensiometer jaw and tested. At 110 ft. lbs. adhesive failure occurred, i.e. at least one surface pulled apart at the adhesive-primer interface. This experiment represented current state-of-the art practice at the time the invention was made.

The above experiment was repeated in all essential details except that all prime coats were eliminated and instead the MPO was applied sparingly to the surfaces to be joined. The adhesive was then applied as before and surfaces were joined. After drying 3 days as before, the assembly was tested in tensiometer. At 115 ft. lbs. cohesive failure occurred, i.e. all surfaces adhered to the adhesive sealant and the sealant itself was pulled apart (obviously cohesive failure is preferred to adhesive failure).

EXAMPLE 2

The experiment of Example 1 was repeated in all essential details except 2-amino-2-ethyl-1,3-propanediol (AEPD) 476 g (4 moles) and adipic acid 511 g (3.5 moles) were substituted for the tris(hydroxymethyl)aminomethane and dimethyl glutarate. After heating at 200° C until an acid value of 26 was reached to form the oxazoline, 43 g additional AEPD (0.36 mole) was added. Heating was continued to an acid value of less than 5, then cooled to about 100° C. There was then added 180 g of paraformaldehyde (6 moles) with 500 g ethanol and 0.2 g sodium methoxide. The mixture was agitated at this temperature until it became clear at which time the reaction was judged to be complete. The resulting product had a viscosity of G to H, a color, Gardner scale, of 10–11 and was clear. The acid value was nil.

The product was used in the same manner as described in Example 1 to promote adhesion of the sealant to glass and metal surfaces. After a suitable drying period the assemblage was tested in a tensiometer. The sealant failed before the MPO did.

EXAMPLE 3

An acrylonitrile-butadiene-styrene terpolymer 533 g having free carboxyl groups and an equivalent weight of about 1,333 (the product used was Hycar CTBNX manufactured by B. F. Goodrich Co.) was dissolved in 50 g benzene in a reaction vessel equipped with an agitator, condenser, a distillation trap and a heat source. There was added 2-amino-2-methyl-1-propanol 62 g (0.7 mole). The mixture was heated at reflux for 6 hours, then cooled to 100° C. There was added paraformaldehyde 21 g (0.7 moles as formaldehyde), 200 g ethanol and 0.05 g sodium methoxide. The mixture was agitated without further heating until it became clear.

The product was used in the same manner as described in Example 1 to promote adhesion of the sealant to glass and metal surfaces. After a suitable drying period the assemblage was tested in a tensiometer. The sealant failed before the MPO did.

EXAMPLE 4

The experiment of Example 1 is repeated in all essential details except that 2-amino-2-methyl-1,3-propanediol is substituted for tris(hydroxymethyl)aminomethane on an equi-molar basis, and azelaic acid is substituted for dimethyl glutarate on an equi-molar basis.

The product is used in the same manner as described in Example 1 to promote adhesion of the sealant to glass and metal surfaces. After a suitable drying period the assemblage is tested in a tensiometer. The sealant fails before the MPO does.

EXAMPLE 5

The experiment of Example 1 is repeated in all essential details except that 2-amino-2-methyl-1-propanol is substituted for tris(hydroxymethyl)aminomethane on an equi-molar basis, and oxalic acid is substituted for dimethyl glutarate on an equi-molar basis.

The product is used in the same manner as described in Example 1 to promote adhesion of the sealant to glass and metal surfaces. After a suitable drying period the assemblage is tested in a tensiometer. The sealant fails before the MPO does.

EXAMPLE 6

The experiment of Example 2 is repeated in all essential details except that 2-amino-2-methyl-1,3-propanediol is substituted for tris(hydroxymethyl)aminomethane on an equi-molar basis, and succinic acid is substituted for adipic acid on an equi-molar basis.

The product is used in the same manner as described in Example 1 to promote adhesion of the sealant to glass and metal surfaces. After a suitable drying period the assemblage is tested in a tensiometer. The sealant fails before the MPO does.

EXAMPLE 7

The experiment of Example 1 is repeated in all essential details except that 2-amino-2-methyl-1-propanol is substituted for tris(hydroxymethyl)aminomethane on an equi-molar basis, and adipic acid is substituted for dimethyl glutarate on an equi-molar basis.

The product is used in the same manner as described in Example 1 to promote adhesion of the sealant to glass and metal surfaces. After a suitable drying period the assemblage is tested in a tensiometer. The sealant fails before the MPO does.

EXAMPLE 8

The experiment of Example 3 is repeated in all essential details except that a high acid alkyd resin is substituted for the Hycar polymer on an equivalent weight basis.

The product thereby obtained is used in the same manner as described in Example 1 to promote adhesion of the sealant to glass and metal surfaces. After a suitable drying period, the assemblage is tested in a tensiometer. The sealant fails before the MPO does.

EXAMPLE 9

The experiment of Example 3 is repeated in all essential details except that a high acid acrylic resin is substituted for the Hycar polymer on an equivalent weight basis.

The product thereby obtained is used in the same manner as described in Example 1 to promote adhesion of the sealant to glass and metal surfaces. After a suitable drying period, the assemblage is tested in a tensiometer. The sealant fails before the MPO does.

EXAMPLE 10

The experiment of Example 3 is repeated in all essential details except that a high acid polyester resin is substituted for the Hycar polymer on an equivalent weight basis.

The product thereby obtained is used in the same manner as described in Example 1 to promote adhesion of the sealant to glass and metal surfaces. After a suitable drying period, the assemblage is tested in a tensiometer. The sealant fails before the MPO does.

We claim:

1. In a process for joining glass-to-metal surfaces by placing a non-rigid polymeric adhesive between said surfaces to be joined, the improvement comprising the step of applying to said surfaces, prior to applying said adhesive, a methylolated polyoxazoline.

2. The improvement of claim 1 wherein said methylolated polyoxazoline is the product derived by reacting an aminohydroxy compound represented by the formula

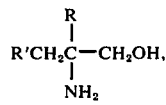

where R is methyl, ethyl or hydroxymethyl and R' is hydrogen or hydroxyl, with a dibasic acid represented by the formula $(CH_2)_x(COOH)_2$ where $x$ is zero or an integer from 1 to 7 and condensing the product so obtained with formaldehyde.

3. The improvement of claim 2 wherein said aminohydroxy compound is tris(hydroxymethyl)aminomethane and said dibasic acid is glutaric acid.

4. The improvement of claim 2 wherein said aminohydroxy compound is tris(hydroxymethyl)aminomethane and said dibasic acid is succinic acid.

5. The improvement of claim 2 wherein said aminohydroxy compound is tris(hydroxymethyl)aminomethane and said dibasic acid is adipic acid.

6. The improvement of claim 2 wherein said aminohydroxy compound is tris(hydroxymethyl)aminomethane and said dibasic acid is azelaic acid.

7. The improvement of claim 2 wherein said aminohydroxy compound is tris(hydroxymethyl)aminomethane and said dibasic acid is oxalic acid.

8. The improvement of claim 1 wherein said methylolated polyoxazoline is the product derived by reacting an aminohydroxy compound corresponding to the formula

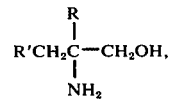

where R is methyl, ethyl or hydroxymethyl and R' is hydrogen or hydroxyl with a polymer containing carboxylic acid groups and condensing the product so obtained with formaldehyde.

9. The improvement of claim 8 wherein said polymer is an acrylonitrile-styrene-butadiene terpolymer container carboxylic acid groups.

10. The improvement of claim 8 wherein said polymer is a high acid number alkyd resin.

11. The improvement of claim 8 wherein said polymer is a high acid number polyester resin.

12. The improvement of claim 8 wherein said polymer is a high acid number acrylic resin.

* * * * *

UNITED STATES PATENT OFFICE
CERTIFICATE OF CORRECTION

Patent No. 4,001,068            Dated January 4, 1977

Inventor(s) Glenn Nelson Robinson et al.

It is certified that error appears in the above-identified patent and that said Letters Patent are hereby corrected as shown below:

Column 1, line 56, "hydroxymenthyl" should read -- hydroxymethyl --

Column 3, line 13, "arcylic" should read -- acrylic --

Signed and Sealed this twelfth Day of July 1977

[SEAL]

Attest:

RUTH C. MASON
Attesting Officer

C. MARSHALL DANN
Commissioner of Patents and Trademarks